United States Patent [19]

Ray, Jr. et al.

[11] 4,101,700
[45] Jul. 18, 1978

[54] THERMALLY INSULATING DUCT LINER

[75] Inventors: Richard James Ray, Jr., Toledo; Daniel Paul Kopy, Rossford; Theodore Richard Rohweder, Toledo, all of Ohio

[73] Assignee: Johns-Manville Corporation, Denver, Colo.

[21] Appl. No.: 666,523

[22] Filed: Mar. 12, 1976

[51] Int. Cl.² .............................................. B32B 3/10
[52] U.S. Cl. ........................... 428/131; 138/DIG. 2; 428/138; 428/285; 428/286; 428/323; 428/426; 428/920
[58] Field of Search ............... 428/131, 138, 195, 196, 428/198, 210, 233, 236, 247, 255, 285, 286, 288, 297, 323, 426, 326, 438, 920, 921; 138/140, 141, 145, DIG. 2, 124, 137, 149; 174/121 A, 122 R

[56] References Cited

U.S. PATENT DOCUMENTS

| | | | |
|---|---|---|---|
| 1,503,337 | 7/1924 | Seigle | 428/239 |
| 2,720,109 | 10/1955 | Ehrlich | 428/236 |
| 3,092,529 | 6/1963 | Pearson | 138/DIG. 2 |
| 3,149,019 | 9/1964 | Skotnecki et al. | 428/236 |
| 3,374,142 | 3/1968 | Kreckl | 428/236 |
| 3,513,065 | 5/1970 | Pearson | 428/247 |
| 3,547,162 | 12/1970 | Schaerer | 138/124 |
| 3,712,846 | 1/1973 | Daniels et al. | 428/301 |
| 3,926,894 | 12/1975 | Clark | 138/DIG. 1 |

*Primary Examiner*—James J. Bell
*Attorney, Agent, or Firm*—Robert M. Krone; Joseph J. Kelly; Charles C. Corbin

[57] ABSTRACT

Disclosed herein is a flexible thermally insulating duct liner comprising a fibrous thermal insulation layer having an organic fibrous layer having an open structure bonded to its working face, the working face being thereafter coated with a flame retardant vinyl polymer containing coating. The duct liner of the present invention has an extremely smooth surface which reduces air friction to a minimum. Still the product is very flexible, easy to work with, and resistant to delamination or working surface failure.

13 Claims, No Drawings

THERMALLY INSULATING DUCT LINER

Inorganic fibrous thermal insulation duct liner products are well known. These products are usually blankets of fiber glass up to about 3 inches thick with one surface coated to reduce the resistance to air friction. The duct liner products are attached to the interior of metal ducts or sheet metal duct precursors by adhesives or by various types of metal fasteners. Duct lining insulation provides efficient sound absorption to control air borne noises, and provides the required thermal insulation while using the duct as an air and vapor barrier. The duct lining must be capable of withstanding temperatures as high as 250° F without delaminating or deteriorating and must be capable of withstanding air velocities of up to 2.5 times the products rated velocity without showing any evidence of delamination or continued erosion.

One type of duct liner products are flexible and generally have densities below about 3.5 PCF. The flexible products are usually shipped in rolls that can be unrolled and cut to size for application in ducts. These duct lining products must have a flame spread rating of not over 25, a smoke developed rating no higher than 50 when in the final dry state and a fuel contributed rating of not more than 50, when tested in accordance with ASTM E-84.

One known duct lining material comprises a fiber glass blanket with a heavy coating of black-pigmented neoprene on its working face. This product has a density of about 1.5 PCF and a surface roughness (e) of about 0.0037 feet and higher.

Another prior art product was made by coating a mat made from unwoven textile glass fibers with a neoprene coating and then laminating this coated mat to a cured fiber glass blanket. Such a product is difficult to manufacture and has resulted in undesirably high scrap losses because of delamination and other problems. Also, the sharp bends produced when forming rectangular ducts tends to break some of the fibers in the working face corners.

BRIEF SUMMARY OF THE INVENTION

The present invention provides a flexible air duct or equipment liner comprising a thermal insulation layer of fibrous material and a working face layer of higher density than the thermal insulation layer and having excellent resistance to erosion from an adjacent gaseous stream with an improved working face layer comprising a thin organic fibrous facing material having a relatively open structure adhered to the thermal insulation layer and coated with a flame retardant vinyl polymer to produce a duct liner having a flame spread classification of less than 25, a smoke developed classification of less than 50 and a surface roughness (e) of less than 0.0025 feet. The present invention also provides a method for making the above-described duct liner. Preferably the thermal insulation layer is a glass fiber blanket. The product of the present invention is very soft, resilient, easily folded, and has a remarkably smooth working face.

DETAILED DESCRIPTION AND PREFERRED EMBODIMENTS

The duct liner of the present invention comprises a flexible layer of fibrous thermal insulation such as fiber glass blanket having a density preferably of less than 3 PCF and most preferably about 1.5 PCF. Preferably the fibers are mineral fibers such as glass fibers, refractory fibers, or mineral wool fibers. The blanket of thermal insulation is usually made by melt spinning molten material, such as glass, into fine fibers, spraying a binder, such as a phenolic resin binder in an aqueous carrier, onto the fibers, and collecting the fibers in a relatively uniform blanket of varying thicknesses.

In the process of the present invention, a lightweight organic fibrous web having an open structure is applied to one surface of the thermal insulation blanket prior to curing of the binder in the thermal insulation blanket. The two layers are then passed through a curing device where the two layers are simultaneously heated while they are being held together under sufficient pressure to compress the insulation layer somewhat e.g. the two layers can be passed simultaneously through a set of heated platens of the type disclosed in U.S. Pat. Nos. 3,518,157 or 3,865,540, the disclosures of which are herein incorporated by reference. Conventional curing ovens with flight pads could also be used, but thickness control would not be as good and flight marks may result. Heating the two layers under compression cures the binder in the thermal insulation layer and also bonds the thin fibrous organic layer to the thermal insulation layer because of the binder on the fibers on the surface of the thermal insulation layer.

A flame retardant coating is then applied to the fibrous organic layer by conventional means, such as spraying, roller coating, etc. Because of the open structure of the thin organic layer, part of the coating passes through the organic layer and into the very upper surface of the thermal insulation layer. The coated duct liner product is then treated to dry the coating, and the flexible duct liner is usually wound into a roll for packaging and shipment.

The nature of the thin organic fibrous web is critical to the performance of the product. While various materials such as nylon, rayon, and polyethylene have been tried, only rayon materials have proved satisfactory. Even with rayon, a relatively lace-like, open structure is critical, otherwise the working face will not withstand working temperatures up to 250° F without embrittlement and a tendency to delaminate or deteriorate. It is not understood why an open structure in the organic fibrous web is necessary, but it may have something to do with the way in which it allows heat to dissipate faster and the manner in which the flame retardant coating permeates a web having an open structure versus a web having a uniform or random essentially continuous or solid structure. Such open structure or patterned webs are disclosed in U.S. Pat. Nos. 2,862,251, 3,081,500, 3,081,512, 3,081,514, and 3,081,515. A particularly preferred organic fibrous web for use in the present invention is available from CHICOPEE MILLS, Milltown, N.J. Having the benefit of this disclosure, it would be within the ordinary skill of the art to select suitable equivalent material for the specific preferred organic fibrous web disclosed above.

The organic fibrous web provides a smooth surface on the thermal insulation layer which results in a very low and desirable roughness factor which reduces air friction. However, the organic fibrous layer tends to be highly combustible and therefore would not pass the stringent flame spread and smoke requirements required of a duct liner product. While flame proof fiber glass mats have been used before for the same purpose as the organic fibrous layer in the present invention, the flame proof mats, were substantially more expensive than the organic fibrous mat used in the present invention. While the organic fibrous material described above has been used in the past on fiber glass products, it was not realized that it could be used to make an improved duct liner at a lower price than heretofore possible with the fiber glass mats.

For example, the organic fibrous material has been applied to fiber glass products such as top liners for automobiles to improve their handability by the installers of the top liners. In these products the organic fibrous layer is coated with a binder that has some flame retardency, but insufficient to pass the ASTM E-84 test because flamability is not so much a problem since the organic fibrous layer is sandwiched between the fiber glass layer and the sheet metal top of the automobile. Also, the organic fibrous material has been applied to rigid fiber glass ceiling tile to provide a base for an attractive paint and to reduce the amount of paint required to produce an attractive ceiling. While a flame retardant paint was sprayed on the rigid ceiling tile and organic facing to make a flame proof ceiling tile, it was not realized by those skilled in the art that the organic facing could be applied to a flexible thermal insulation layer and coated to form a duct liner capable of withstanding erosion at air velocities of up to 5000 feet per minute and higher at temperatures up to 250° F, and having a very low roughness factor.

After the binder in the fibrous layer has been substantially cured and the organic fibrous layer has been bonded to the insulation layer by curing the binder, a flame retardant coating is applied to the exposed organic fibrous layer by any suitable manner. Some of the coating passes through the open portions of the organic fibrous layer and is deposited on the surface of the thermal insulation. Preferably, the coating is applied by conventional spraying, but can also be applied by roller coating and other conventional techniques. Many so called flame retardant coatings have been tested, but most have failed for one reason or another. Many fail because they attack the organic fibrous material described above either upon application, drying, or upon being heated to 250° F. The preferred coating compositions for use in the present invention are those having a water base and containing polyvinyl acetate as a binder, an inorganic filler, an inorganic compound having flame retardant properties, and a plasticizer. Fillers commonly used in flame retardant coating or adhesive compositions can be used, but aluminum oxide or alumina trihydrate are preferred. Inorganic compounds commonly used in flame retardant coatings or adhesives because of their flame retardant properties can be used, but antimony compounds such as antimony oxychloride or antimony trioxide are preferred. Plasticizers compatible with polyvinyl acetate can be used, and a phthalate ester or tricresyl phosphate are preferred. It is also preferred to add a black pigment such as carbon black to produce a black coating as is customary in the art.

A particularly preferred coating composition is a water base mixture containing about 49%, plus or minus 2%, total solids and an ash content of about 25%, plus or minus 2%, after 1000° F, based on the initial wet weight. The solids of this coating comprise about 40–45 parts of polyvinyl acetate, 30–40 parts of alumina or alumina trihydrate, about 5–15 parts of antimony oxychloride or antimony trioxide, about 4–9 parts of a plasticizer such as a phthalate ester or tricresyl phosphate and optionally about 5–6 parts of carbon black. Such a coating material can be obtained from TANCO ADHESIVES, Greenville, S.C., under the code name of 9971-B. This coating composition has a typical viscosity of 300, plus or minus about 150, cps and a typical density of about 11.2, plus or minus about 0.5, pounds per gallon.

The flame retardant coating composition is applied to the fibrous organic layer at an application amount sufficient to provide a smooth surface and to meet the flame spread and smoke developed maximum limits. A typical application density is at a rate sufficient to produce about 9 grams of dry coating per square foot of duct liner surface. While as little as 5 grams of dry coating per square foot is sufficient to provide adequate fire retardancy, at least 7½ grams of dry coating per square foot is preferred in order to produce a smooth surface having a very low roughness factor. Amounts in excess of about 11 grams per square foot on a dry basis can be used, but any improvement in product properties produced by such a heavy coating would be more than offset by the increased cost of the coating component.

After the application of the flame retardant coating, the resultant composite liner product is passed into an oven or other heating means to dry the coating and to complete the cure of any uncured binder remaining in the fibrous thermal insulation layer. The following example is representative of the preferred embodiment of the present invention.

EXAMPLE

A glass fibrous blanket having a predetermined thickness and density and containing flame attenuated glass fibers coated with a phenolic resin base aqueous binder is covered with a non-woven rayon facing having a mesh-like open structure. The two layers are then passed between a set of heated platens of the type disclosed in U.S. Pat. No. 3,865,540 with the gap set to place the fibrous thermal insulation layer under compression and to produce the desired thickness of that layer after the binder has been cured. Upon removal from the heated platens, the curing of the binder in the thermal insulation layer while under pressure has adhered the rayon layer to the thermal insulation layer. The exposed surface of the rayon layer is then sprayed with an aqueous flame retardant coating containing about 48.5% solids, about 24.9% ash after a 1000° F, based on the wet weight of the coating, and containing about 40–45 parts of polyvinyl acetate, 30–40 parts of alumina TRIHYDRATE, 5–15 parts of antimony oxychloride, 4–9 parts of a plasticizer of the type described above, and about 5–6 parts of carbon black. The application rate was sufficient to produce a dry coating weight of about 9 grams per square foot. The coated composite material was then passed into a dryer where the coating was dried and the product was heated to a temperature sufficient to cure any uncured binder in the thermal insulation layer.

The duct liner product produced by the above process had a flame spread rating of 25 and a smoke developed rating of less than 50. The product withstood air velocities as high as 12,500 feet per minute (2.5 times the rated velocity of 5,000 feet per minute) and had air friction correction factor of about 1.04 at 500 feet per minute and about 1.12 at 5,000 feet per minute. The coated surface of the product had a roughness (e) of about 0.0008 to about 0.0021 feet. The product was easy to handle and presented a soft, friendly non-abrasive feel to the hands. The product could be accurately cut with regular shop tools and had resiliency and tensile strength sufficient to resist undue shop abuse without significant damage. The product could be easily bent at 90° angles without any apparent damage to the coating or any delamination. Delamination did not appear, either in manufacture or in the product tests.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to the specific embodiments disclosed, but instead is to be limited only by the claims appended hereto.

What we claim is:

1. A flexible air duct liner comprising an outer thermal insulation layer of fibrous material and an inner working face layer of higher density than said insulation layer and having resistance to erosion from an adjacent gaseous stream; the improvement comprising:

said working face layer comprising a thin fibrous facing of rayon having a relatively open structure adhered to said thermal insulation layer and having been coated in place with a flame retardant coating containing polyvinyl acetate producing a duct liner having a flame spread classification of less than 25, a smoke developed classification of less than 50, and a surface roughness (e) of less than about 0.0025 feet.

2. A duct liner as defined in claim 1 wherein said outer thermal insulation layer comprises inorganic fibers.

3. A duct liner as defined in claim 2 wherein said fibers are glass fibers.

4. A duct liner as defined in claim 3 wherein said fibrous layer of rayon is nonwoven.

5. A duct liner as defined in claim 4 wherein said flame retardant coating also comprises a filler, an inorganic compound having flame retardant properties, a plasticizer and a black pigment.

6. A duct liner as defined in claim 5 wherein said filler is selected from the group consisting of alumina and alumina hydrate.

7. A duct liner as defined in claim 6 wherein said flame retardant inorganic compound is a compound of antimony.

8. A duct liner as defined in claim 7 wherein said antimony compound is selected from the group consisting of antimony trioxide and antimony oxychloride.

9. A duct liner as defined in claim 8 wherein said black pigment is carbon black.

10. A duct liner as defined in claim 9 wherein said flame retardant coating contains on a dry basis about 40-45 parts of polyvinyl acetate, about 30-40 parts of alumina or alumina trihydrate, about 5-15 parts of antimony oxychloride, about 4-9 parts of a plasticizer, and about 5-6 parts of carbon black.

11. A metal air duct lined with the product defined in claim 1.

12. A metal air duct lined with the product defined in claim 3.

13. A metal air duct lined with the product defined in claim 8.

* * * * *